(12) United States Patent
Amidon et al.

(10) Patent No.: US 9,215,735 B2
(45) Date of Patent: Dec. 15, 2015

(54) SYSTEMS AND METHODS FOR INITIATING COMMUNICATIONS WITH CONTACTS BASED ON A COMMUNICATION SPECIFICATION

(75) Inventors: Christopher M. Amidon, Apex, NC (US); Scott Curtis, Durham, NC (US); Kunal Kandekar, Jersey City, NJ (US); Ravi Reddy Katpelly, Cary, NC (US)

(73) Assignee: MODENA ENTERPRISES, LLC, Wilmington, DE (US)

( * ) Notice: Subject to any disclaimer, the term of this patent is extended or adjusted under 35 U.S.C. 154(b) by 92 days.

(21) Appl. No.: 12/962,705

(22) Filed: Dec. 8, 2010

(65) Prior Publication Data
US 2012/0135718 A1 May 31, 2012

Related U.S. Application Data

(60) Provisional application No. 61/309,899, filed on Mar. 3, 2010.

(51) Int. Cl.
*H04M 3/42* (2006.01)
*H04W 76/02* (2009.01)
*H04L 29/08* (2006.01)

(52) U.S. Cl.
CPC .............. *H04W 76/02* (2013.01); *H04L 67/306* (2013.01)

(58) Field of Classification Search
CPC .... H04M 3/42; H04M 2207/18; H04L 29/08; H04W 4/02
USPC ............... 455/414.1, 564, 566, 518, 415–418
See application file for complete search history.

(56) References Cited

U.S. PATENT DOCUMENTS

| 5,550,907 | A | 8/1996 | Carlsen |
| 5,565,909 | A | 10/1996 | Thibadeau et al. |
| 5,577,041 | A | 11/1996 | Sharma et al. |
| 6,011,975 | A | 1/2000 | Emery et al. |

(Continued)

FOREIGN PATENT DOCUMENTS

| EP | 1923830 A2 | 5/2008 |
| JP | 2004118853 A | 4/2004 |

(Continued)

OTHER PUBLICATIONS

"Park-n Find 2.0—iPhone App Index," at <http://www.iphoneappindex.com/2009/11/19/parkn-find-2-0>, Nov. 19, 2009, copyright 2009, iPhone App Index, 8 pages.

(Continued)

*Primary Examiner* — Michael T Vu
(74) *Attorney, Agent, or Firm* — Olive Law Group, PLLC

(57) ABSTRACT

Disclosed herein are methods and systems for initiating communications with contacts based on a communication specification. According to an aspect, a method may include receiving a communication specification. The communication specification may include identification of one or more contacts, a communication persistence parameter, a geographic location, an event, a date, and a communication channel. The method may also include determining one or more contacts based on the communication specification. Further, the method may include initiating multiple communications with the contacts via at least one communication channel. A communication channel may be a telephone call, an email, a text message, an instant message, and the like.

17 Claims, 13 Drawing Sheets

(56) References Cited

U.S. PATENT DOCUMENTS

| | | |
|---|---|---|
| 6,278,704 B1 | 8/2001 | Creamer et al. |
| 6,314,296 B1 | 11/2001 | Hamada et al. |
| 6,366,856 B1 | 4/2002 | Johnson |
| 6,724,872 B1 | 4/2004 | Moore et al. |
| 6,978,003 B1 | 12/2005 | Sylvain |
| 6,992,584 B2 | 1/2006 | Dooley et al. |
| 7,043,362 B2 | 5/2006 | Krull et al. |
| 7,046,994 B1 | 5/2006 | Padawer et al. |
| 7,047,019 B1 | 5/2006 | Cox et al. |
| 7,054,621 B2 | 5/2006 | Kennedy |
| 7,068,768 B2 | 6/2006 | Barnes |
| 7,085,578 B2 | 8/2006 | Barclay et al. |
| 7,096,009 B2 | 8/2006 | Mousseau et al. |
| 7,120,455 B1 | 10/2006 | Chen et al. |
| 7,139,797 B1 | 11/2006 | Yoakum et al. |
| 7,143,214 B2 | 11/2006 | Hayes et al. |
| 7,184,523 B2 | 2/2007 | Dixit et al. |
| 7,196,630 B2 | 3/2007 | Baker |
| 7,212,111 B2 | 5/2007 | Tupler |
| 7,215,750 B2 | 5/2007 | Nguyen et al. |
| 7,231,428 B2 | 6/2007 | Teague |
| 7,248,677 B2 | 7/2007 | Randall et al. |
| 7,269,413 B2 | 9/2007 | Kraft |
| 7,330,721 B2 | 2/2008 | Bhatia et al. |
| 7,346,668 B2 | 3/2008 | Willis |
| 7,440,900 B2 | 10/2008 | Chang |
| 7,487,190 B2 | 2/2009 | Black et al. |
| 7,526,306 B2 * | 4/2009 | Brems et al. ................. 455/518 |
| 7,529,540 B2 | 5/2009 | Cox et al. |
| 7,542,558 B2 | 6/2009 | Klein et al. |
| 7,548,756 B2 | 6/2009 | Velthuis et al. |
| 7,640,293 B2 | 12/2009 | Wilson et al. |
| 7,796,998 B1 | 9/2010 | Zellner et al. |
| 7,953,447 B2 | 5/2011 | Shostak |
| 8,036,356 B1 | 10/2011 | Ghosh et al. |
| 8,041,020 B2 * | 10/2011 | Drewry et al. ........... 379/211.01 |
| 8,185,132 B1 | 5/2012 | Katpelly et al. |
| 2001/0028703 A1 | 10/2001 | Katseff et al. |
| 2002/0055088 A1 | 5/2002 | Feig |
| 2002/0098844 A1 | 7/2002 | Friedenfelds et al. |
| 2002/0172339 A1 | 11/2002 | Creswell |
| 2003/0050984 A1 | 3/2003 | Pickup et al. |
| 2003/0112928 A1 | 6/2003 | Brown et al. |
| 2003/0119495 A1 | 6/2003 | Hanninen et al. |
| 2003/0147518 A1 | 8/2003 | Albal et al. |
| 2003/0152206 A1 | 8/2003 | Kawaguchi et al. |
| 2003/0182052 A1 | 9/2003 | DeLorme et al. |
| 2004/0066920 A1 | 4/2004 | Vandermeijden |
| 2004/0157562 A1 | 8/2004 | Ovaskainen et al. |
| 2004/0186848 A1 | 9/2004 | Kobashikawa et al. |
| 2005/0033811 A1 | 2/2005 | Bhogal et al. |
| 2005/0202781 A1 | 9/2005 | Steelberg et al. |
| 2005/0272448 A1 | 12/2005 | Tran et al. |
| 2006/0052116 A1 | 3/2006 | Bhogal et al. |
| 2006/0064739 A1 | 3/2006 | Guthrie et al. |
| 2006/0128411 A1 | 6/2006 | Turcanu |
| 2006/0153349 A1 | 7/2006 | Brun et al. |
| 2006/0171523 A1 | 8/2006 | Greenwell |
| 2006/0199567 A1 | 9/2006 | Alston |
| 2006/0200490 A1 | 9/2006 | Abbiss |
| 2006/0215823 A1 | 9/2006 | Gruchala et al. |
| 2006/0247853 A1 | 11/2006 | Jung et al. |
| 2007/0036316 A1 | 2/2007 | Croak et al. |
| 2007/0091878 A1 | 4/2007 | Croak et al. |
| 2007/0117552 A1 | 5/2007 | Gobburu et al. |
| 2007/0135110 A1 | 6/2007 | Athale |
| 2007/0197233 A1 | 8/2007 | Feng |
| 2007/0243880 A1 | 10/2007 | Gits et al. |
| 2007/0249327 A1 | 10/2007 | Nurmi |
| 2007/0260725 A1 | 11/2007 | McCuller |
| 2007/0266097 A1 | 11/2007 | Harik et al. |
| 2007/0281689 A1 | 12/2007 | Altman et al. |
| 2008/0125106 A1 | 5/2008 | Lee et al. |
| 2008/0214148 A1 | 9/2008 | Ramer et al. |
| 2008/0250066 A1 | 10/2008 | Ekstrand et al. |
| 2008/0304637 A1 | 12/2008 | Ganganna |
| 2009/0010405 A1 * | 1/2009 | Toebes ........................ 379/93.23 |
| 2009/0034696 A1 | 2/2009 | Ramanathan |
| 2009/0063154 A1 | 3/2009 | Gusikhin et al. |
| 2009/0086947 A1 | 4/2009 | Vendrow |
| 2009/0104895 A1 | 4/2009 | Kasturi et al. |
| 2009/0124243 A1 | 5/2009 | Routley et al. |
| 2009/0186629 A1 | 7/2009 | Soelberg et al. |
| 2009/0197621 A1 | 8/2009 | Book |
| 2009/0215486 A1 | 8/2009 | Batni |
| 2009/0216775 A1 | 8/2009 | Ratliff et al. |
| 2009/0219921 A1 | 9/2009 | Beinroth et al. |
| 2009/0225968 A1 | 9/2009 | Paranjape |
| 2009/0275307 A1 | 11/2009 | Kahn |
| 2009/0311999 A1 | 12/2009 | Sarkar et al. |
| 2009/0316951 A1 | 12/2009 | Soderstrom |
| 2010/0027777 A1 * | 2/2010 | Gupta et al. ............. 379/210.01 |
| 2010/0062753 A1 * | 3/2010 | Wen et al. ...................... 455/418 |
| 2010/0130213 A1 | 5/2010 | Vendrow et al. |
| 2010/0149306 A1 | 6/2010 | Gopal et al. |
| 2010/0228560 A1 | 9/2010 | Balasaygun et al. |
| 2010/0250672 A1 * | 9/2010 | Vance et al. .................. 709/204 |
| 2010/0316205 A1 | 12/2010 | Zheng et al. |
| 2010/0317341 A1 | 12/2010 | Ferren |
| 2011/0034156 A1 | 2/2011 | Gatti et al. |
| 2011/0212712 A1 * | 9/2011 | Abdel-Kader ................ 455/415 |
| 2012/0134321 A1 | 5/2012 | Amidon et al. |
| 2012/0135716 A1 | 5/2012 | Katpelly et al. |
| 2012/0135744 A1 | 5/2012 | Curtis et al. |
| 2012/0136529 A1 | 5/2012 | Curtis et al. |
| 2012/0136942 A1 | 5/2012 | Amidon et al. |

FOREIGN PATENT DOCUMENTS

| | | |
|---|---|---|
| JP | 2004205443 A | 7/2004 |
| JP | 2007079945 A | 3/2007 |
| TW | 262408 B | 9/2006 |
| WO | 01/31964 A1 | 5/2001 |
| WO | 01/58165 A2 | 8/2001 |
| WO | 02/11407 A2 | 2/2002 |
| WO | 2006/075853 A1 | 7/2006 |
| WO | 2009/022446 A1 | 2/2009 |

OTHER PUBLICATIONS

"Polar Bear Farm—iPhone Apps," at <http://www2.polarbearfarm.com/telegram.html>, copyright 2008, Polar Bear Farm Ltd, printed Apr. 27, 2011, 2 pages.

Scotsman.com, "City to showcase Typetalk phone system for deaf," Dec. 3, 2008, at <http://www.scotsman.com/news/city_to_showcase_typetalk_phone_system_for_deaf_1_1280979>, printed Oct. 13, 2011, 1 page.

"slydial situations," originally found at <http://slydial.com/>, earliest archived copy dated Aug. 27, 2008, found using the Internet Archive, printed Apr. 27, 2011, 2 pages.

"Ultimate Android," Dec. 2009, 5 pages.

"User-Centric Implications | RebelVox Technology," User Benefits, found at <http://www.rebelvox.com/en/technology/user-benefits.php> on the Internet Archive, dated Mar. 1, 2009, copyright 2009, RebelVox, printed Nov. 11, 2011, 1 page.

Wan, C.-Y. et al., "Overload Traffic Management for Sensor Networks," ACM Transactions on Sensor Networks, vol. 3, No. 4, Article 18, Oct. 2007, copyright 2007, ACM, 38 pages.

Audet, F. et al., "Extended REFER," Slides from International Engineering Task Force (IETF), 59th Meeting, Feb. 29-Mar. 5, 2004, Seoul, South Korea, found at <http://www.softarmor.com/sipping/meets/ietf59/slides/>, 13 pages.

Campbell, A. T. and Choudhury, T., "Toward Societal Scale Sensing using Mobile Phones," white paper presented at the NSF Workshop on Future Directions in Networked Sensing Systems, Nov. 12-13, 2009, Arlington, Virginia, 1 page.

Campbell, A. T. et al., "CenceMe: Injecting Sensing Presence into Social Network Applications using Mobile Phones (Demo Abstract)," In Proc. of Ninth ACM International Symposium on Mobile Ad Hoc Networking and Computing (MobiHoc '08), Hong Kong, May 27-30, 2008, 2 pages.

(56) References Cited

OTHER PUBLICATIONS

Campbell, A. T. et al., "CenceMe: Injecting Sensing Presence into Social Network Applications using Mobile Phones (Demo Abstract)," In Proc. of Ninth Workshop on Mobile Computing Systems and Applications (HotMobile 2008), Napa Valley, California, Feb. 25-26, 2008, 1 page.

Campbell, Andrew T. et al., "Demo Abstract: Transforming the Social Networking Experience with Sensing Presence from Mobile Phones," SenSys'08, Nov. 5-7, 2008, Raleigh, North Carolina, 2 pages.

Campbell, Andrew T. et al., "People-Centric Urban Sensing," In Proc. of Second ACM/IEEE Annual International Wireless Internet Conference (WICON 2006), Boston, Massachusetts, Aug. 2-5, 2006, 14 pages.

Campbell, Andrew T. et al., "The Rise of People-Centric Sensing," IEEE internet Computing, Jul./Aug. 2008, published by the IEEE Computer Society, copyright 2008, IEEE, pp. 12-21, 10 pages.

"cellity Address book 2.0," Presentation, Mobile Media Summit, Medienforum nrw, Koln, Jun. 24, 2009, cellity AG, Hamburg, Germany, 18 pages.

"City to showcase Typetalk phone system for deaf," News.scotsman.com, at <http://news.scotsman.com/health/City-to-showcase--Typetalk.4755272.jp>, updated on Dec. 3, 2008, printed May 2, 2011, 2 pages.

Eisenman, S. and Campbell, A., "E-CSMA: Supporting Enhanced CSMA Performance in Experimental Sensor Networks using Per-neighbor Transmission Probability Thresholds," In Proc. of IEEE INFOCOM 2007, Anchorage, Alaska, May 6-12, 2007, 9 pages.

Eisenman, S. B. and Campbell, A. T., "Structuring Contention-based Channel Access in Wireless Sensor Networks," IPSN'06, Apr. 19-21, 2006, Nashville, Tennessee, copyright 2006, ACM, 9 pages.

Eisenman, S. B. et al., "The BikeNet Mobile Sensing System for Cyclist Experience Mapping," SenSys '07, Nov. 6-9, 2007, Sydney, Australia, copyright 2007, ACM, 15 pages.

Eisenman, Shane B. et al., "BikeNet: A Mobile Sensing System for Cyclist Experience Mapping," ACM Transactions on Sensor Networks, vol. 6, No. 1, Article 6, Dec. 2009, copyright 2009, ACM, 39 pages.

Eisenman, Shane B. et al., "MetroSense Project: People-Centric Sensing at Scale," WSW'06 at SenSys '06, Oct. 31, 2006, Boulder, Colorado, copyright 2006, ACM, 6 pages.

Eisenman, Shane B. et al., "Techniques for Improving Opportunistic Sensor Networking Performance," In Proc. of International Conference on Distributed Computing in Sensor Networks (DCOSS 2008), Santorini Island, Greece, Jun. 11-14, 2008, 20 pages.

"Ensure calls are never missed with SwyxWare Extended Call Routing," SAS.UK, originally found at <http://www.sas-uk.net/Swyx-Extended-Call-Routing.htm>, found at Internet Archive, dated May 9, 2008, printed May 2, 2011, 1 page.

Fallon, Sean, "Tame Cube Concept: A Good Excuse is Just a Roll Away," Apr. 10, 2008, at <http://gizmodo.com/378514/tame-cube-concept-a-good-excuse-is-just-a-roll-away>, printed Oct. 13, 2011, 2 pages.

Forrest, Brady, "iPhone's Location-Aware Apps," O'Reilly Radar, Jul. 14, 2008, copyright 2005-2009, O'Reilly Media, Inc., Internet publication, at <http://radar.oreilly.com/2008/07/iphone-location-aware-apps.html>, printed Sep. 15, 2009, 3 pages.

"Free Long Distance Calls via Google Maps," article published on Feb. 21, 2007, at <http://www.fivecentnickel.com/2007/02/21/free-long-distance-calls-via-google-maps>, copyright 2005-2008, PlanetB Media, LLC, printed Nov. 11, 2008, 7 pages.

"G-Park," PosiMotion website, at <http://www.posimotion.com/index.php?go=applications&option=view&entry=1>, copyright 2007-2009, PosiMotion LLC, 2 pages.

"GeoWhitePages," dated Aug. 6, 2006, at <http://babasave.wordpress.com/2006/08/06/geowhitepages>, printed Nov. 11, 2008, 3 pages.

"Gizmo5," Wikipedia, found at <http://en.wikipedia.org/wiki/Gizmo5> on Internet Archive, last modified May 31, 2008, captured Jun. 13, 2008, printed Nov. 11, 2011, 2 pages.

"Google Maps Mania: Google Maps US/Canada Phone Book Mashups," dated Jun. 9, 2006, posted by Mike Pegg, at <http://googlemapsmania.blogspot.com/2006/06/google-maps-uscanada-phone-book.html>, printed Nov. 11, 2008, 1 page.

"Google PhoneBook," at <http://snopes.com/computer/internet/google.asp>, last updated Feb. 21, 2005, copyright 1995-2008, snopes.com, printed Nov. 11, 2008, 2 pages.

"Google Stalk," at <http://shinyplasticbag.com/projects/stalk>, available on the Internet Archive as of Jan. 4, 2006, printed Nov. 11, 2008, 1 page.

"GrandCentral," Wikipedia, found at <http://en.wikipedia.org/wiki/GrandCentral> on Internet Archive, last modified Aug. 8, 2008, captured Aug. 10, 2008, printed Nov. 11, 2011, 2 pages.

"IBM WebSphere Presence Server," IBM Data Sheet, Dec. 2007, IBM Corporation, found at ftp://public.dhe.ibm.com/software/pervasive/presenceserver/Presence_6_2_DS_Final.pdf, 4 pages.

"Ifbyphone: IVR Solutions, Click to Call, Voice Broadcast, Call Routing," originally found at <http://public.ifbyphone.com/>, archived copy dated Jul. 2, 2008, found using the Internet Archive, copyright 2008, ifbyphone, printed Apr. 27, 2011, 4 pages.

Kaowthumrong, K. et al., "Automated Selection of the Active Device in Interactive Multi-Device Smart Spaces," in Workshop at UbiComp'02: Supporting Spontaneous Interaction in Ubiquitous Computing Settings,Goteborg, Sweden, Sep. 29-Oct. 1, 2002, 6 pages.

Koumpis, K. and Renals, S., "The Role of Prosody in a Voicemail Summarization System," In Proc. International Speech Communication Association (ISCA) Workshop on Prosody in Speech Recognition and Understanding, Red Bank, NJ, Oct. 22-24, 2001, pp. 87-92, 6 pages.

Lane, Nicholas D. et al., "A Survey of Mobile Phone Sensing," IEEE Communications Magazine, Sep. 2010, copyright 2010, IEEE, pp. 140-150, 11 pages.

Lane, Nicholas D. et al., "Ambient Beacon Localization: Using Sensed Characteristics of the Physical World to Localize Mobile Sensors," EmNets'07, Jun. 25-26, 2007, Cork, Ireland, copyright 2007, ACM, 5 pages.

Lane, Nicholas D. et al., "Cooperative Techniques Supporting Sensor-based People-centric Inferencing," In Proc. of Sixth International Conference on Pervasive Computing, Sydney, Australia, May 19-22, 2008, 18 pages.

Lane, Nicholas D. et al., "The Influence of Microprocessor Instructions on the Energy Consumption of Wireless Sensor Networks," In Proc. of Third Workshop on Embedded Networked Sensors (EmNets 2006), pp. 41-45, May 30-31, 2006, Cambridge, Massachusetts, 5 pages.

Lane, Nicholas D. et al., "Urban Sensing: Opportunistic or Participatory?," In Proc. of Ninth Workshop on Mobile Computing Systems and Applications (HotMobile 2008), Feb. 25-26, 2008, Napa Valley, California, 6 pages.

Lane, Nicholas D. et al., "Urban Sensing: Opportunistic or Participatory?," In Proc. of First Workshop Sensing on Everyday Mobile Phones in Support of Participatory Research, Nov. 6, 2007, Sydney, Australia, 1 page.

Lee, S.-B. et al., "Solicitation-based Forwarding for Sensor Networks," In Proc. of Third Annual IEEE Conf. on Sensor, Mesh and Ad Hoc Communications and Networks (SECON 2006), Reston, Virginia, Sep. 25-28, 2006, 10 pages.

Lu, H. et al., "SoundSense: Scalable Sound Sensing for People-Centric Applications on Mobile Phones," MobiSys'09, Jun. 22-25, 2009, Krakow, Poland, copyright 2009, ACM, 14 pages.

Lu, Hong et al., "Bubble-Sensing: A New Paradigm for Binding a Sensing Task to the Physical World using Mobile Phones," In Intl. Workshop on Mobile Devices and Urban Sensing, St. Louis, Missouri, Apr. 21, 2008, 7 pages.

Messner, Richard A., "An Integrated Command Control and Communications Center for First Responders," Department of Electrical and Computer Engineering, University of New Hampshire, Durham, New Hampshire, 2005, found at <http://www.ece.unh.edu/svpal/Papers/2005%20SPIE%20Paper.pdf>, 14 pages.

(56) References Cited

OTHER PUBLICATIONS

"Method and System to Precisely Identify and Notify Callee's Status in Cellular Phone," at <http://priorartdatabase.com/IPCOM/000175628>, Oct. 16, 2008, 3 pages.

Milewski, Allen E. and Smith, Thomas M., "Providing Presence Cues to Telephone Users," AT&T Labs, Research, Oct. 3, 2000, at <http://web.mitedu/bentley/www/mobile/papers/presencecues.pdf>, 9 pages.

Miluzzo, E. et al., "CaliBree: A Self-calibration System for Mobile Sensor Networks," S. Nikoletseas et al. (Eds.), DCOSS 2008, LNCS 5067, copyright 2008, Springer-Verlag Berlin Heidelberg, pp. 314-331, 18 pages.

Miluzzo, E. et al., "CenceMe—Injecting Sensing Presence into Social Networking Applications," G. Kortuem et al., (Eds.), EuroSSC, 2007, LNCS 4793, pp. 1-28, copyright 2007, Springer-Verlag Berlin Heidelberg, 28 pages.

Miluzzo, E. et al., "Evaluating the iPhone as a Mobile Platform for People-Centric Sensing Applications," UrbanSense08, Nov. 4, 2008, Raleigh, North Carolina, pp. 41-45.

Miluzzo, E. et al., "Poster Abstract: Virtual Sensing Range," SenSys'06, Nov. 1-3, 2006, Boulder, Colorado, copyright 2006, ACM, 2 pages.

Miluzzo, E. et al., "Radio Characterization of 802.15.4 and Its Impact on the Design of Mobile Sensor Networks," R. Verdone (Ed.), EWSN 2008, LNCS 4913, pp. 171-188, copyright 2008, Springer-Verlag Berlin Heidelberg, 18 pages.

Miluzzo, E. et al., "Sensing Meets Mobile Social Networks: The Design, Implementation and Evaluation of the CenceMe Application," SenSys'08, Nov. 5-7, 2008, Raleigh, North Carolina, pp. 337-350, copyright 2008, ACM, 14 pages.

Musolesi, M. et al., "The Second Life of a Sensor: Integrating Real-world Experience in Virtual Worlds using Mobile Phones," HotEmNets'08, Jun. 2-3, 2008, Charlottesville, Virginia, copyright 2008, ACM, 5 pages.

Nakanishi et al., "iCAMS: A Mobile Communication Tool Using Location and Schedule Information," PERVASIVE computing, published by IEEE CS and IEEE ComSoc, Jan.-Mar. 2004, pp. 82-88, copyright 2004, IEEE, 7 pages.

* cited by examiner

SYSTEMS AND METHODS FOR INITIATING COMMUNICATIONS WITH CONTACTS BASED ON A COMMUNICATION SPECIFICATION

CROSS REFERENCE TO RELATED APPLICATIONS

This application claims the benefit of U.S. provisional patent application No. 61/309,899, filed Mar. 3, 2010, and titled DYNAMIC UPDATES TO ADDRESS BOOK CONTACTS: THE HANDHELD AS PERSONAL BLACK BOX, the content of which is hereby incorporated herein by reference in its entirety.

TECHNICAL FIELD

The present disclosure relates to systems and methods for initiating communications with one or more contacts.

BACKGROUND

Many mobile devices, such as smart phones, have been enabled with functionality for communicating with others using any of several different techniques. For example, a mobile device may be used for communicating with another via a voice call, an email, an instant message, a text message, or a social networking service (e.g., FACEBOOK® social networking service). A smart phone may include an address book application containing contacts, and one of the contacts may be selected for communication through one of the communication techniques.

In an example of communicating with a contact, the user may open the address book application and select one of the contacts for communication. Next, the device may present options for communicating with the selected contact. The user may select to initiate a telephone call, an email communication, an instant message, or a text message communication with the selected contact. If, for example, the selected contact does not answer the telephone call, the user may leave a voicemail message on an answering service, or disconnect the call. Afterwards, the user may attempt a different telephone number or communication technique for reaching the selected contact. To again try to reach the contact, the user must select the contact and then select a different communication technique for communicating with the contact. This process can be burdensome to users, especially in the case of emergency situations when it is desired to reach the contact as soon as possible. Similarly, in the case of attempting to reach multiple contacts, this process can be even more burdensome to users, because the user must separately select each contact. Accordingly, it is desirable to provide improved systems and methods for initiating communications with contacts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are methods and systems for initiating communications with contacts based on a communication specification. According to an aspect, a method may include receiving a communication specification. The communication specification may include identification of one or more contacts, a communication persistence parameter, a geographic location, an event, a date, and a communication channel. The method may also include determining one or more contacts based on the communication specification. Further, the method may include initiating multiple communications with the contacts via at least one communication channel. A communication channel may be a telephone call, an email, a text message, an instant message, and the like.

According to another aspect, a method may include communicating with an originator of a communication. For example, the communication may be a group communication in accordance with embodiments of the present disclosure. The method may also include presenting to a user one or more contacts associated with the communication. The contacts may be those to which the group communication is directed. Further, the method may include receiving user input for joining the contacts to the communication. The method may also include initiating one or more communications with the contacts via one or more communication channels in response to receiving the user input.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Figure 1:
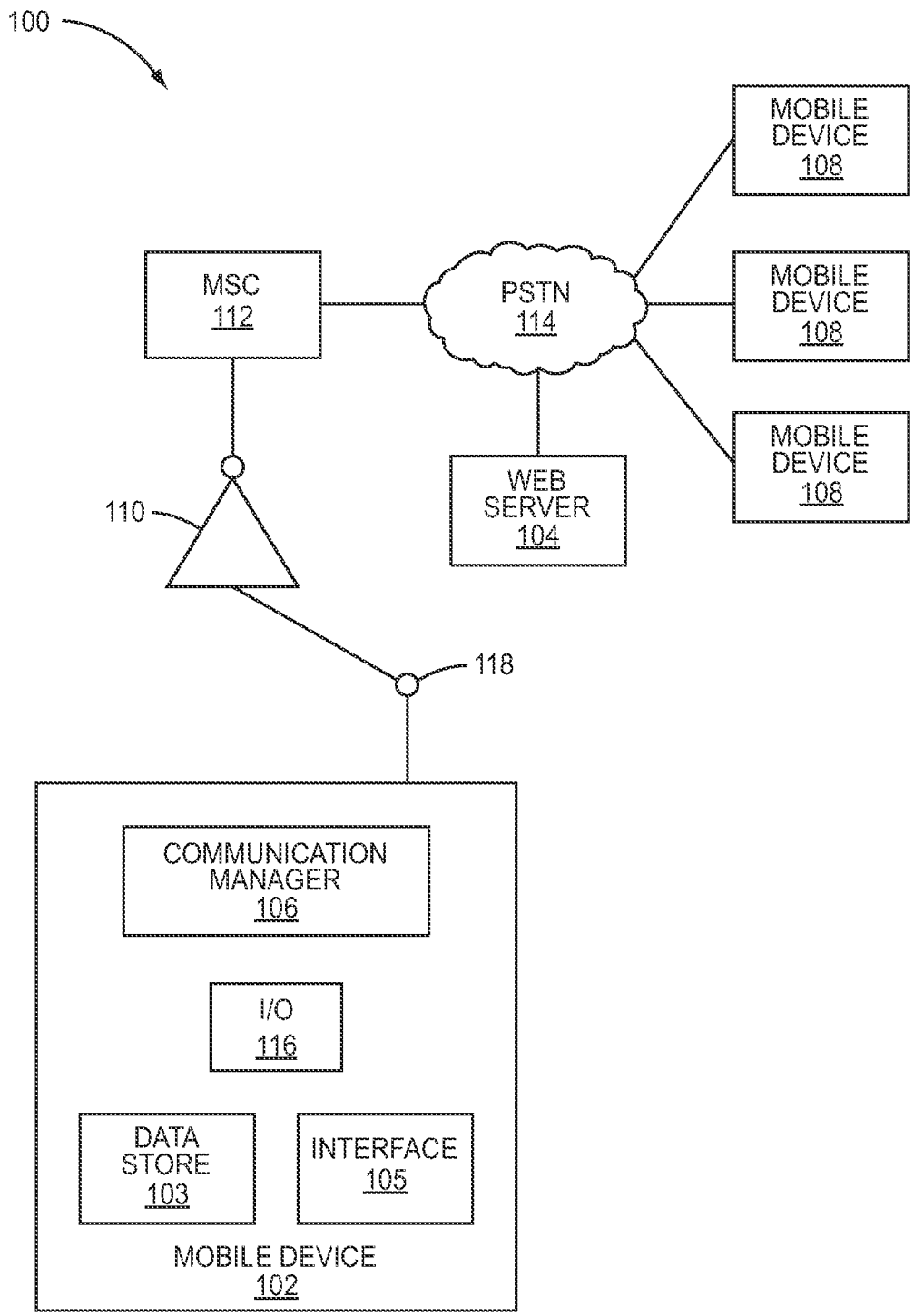
FIG. 1 is a schematic diagram of a system for receiving a communication specification, determining one or more contacts based on the communication specification, and initiating multiple communications with the one or more contacts via one or more communication channels according to embodiments of the present disclosure.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Embodiments of the present disclosure enable a computing device to receive a communication specification, to determine one or more contacts based on the communication specification, and to initiate multiple communications with the contact(s) via one or more communication channels. Other embodiments of the present disclosure enable a computing device to communicate with an originator of a communication, to present to a user one or more contacts associated with the communication, to receive user input for joining the contact(s) to the communication, and to initiate one or more communications with the contact(s) via one or more communication channels in response to receiving the user input. Further, other embodiments enable a user to implement other features of the present disclosure in a computing device as will be described in further detail herein.

As referred to herein, the term "computing device" should be broadly construed. It can include any type of mobile device, for example, a smart phone, a cell phone, a pager, a personal digital assistant (PDA, e.g., with GPRS NIC), a mobile computer with a smart phone client, or the like. A computing device can also include any type of conventional computer, for example, a desktop computer, a laptop computer, a netbook computer, a notebook computer, or the like. A typical mobile device is a wireless data access-enabled device (e.g., an iPHONE® smart phone, a BLACKBERRY® smart phone, a NEXUS ONE™ smart phone, an iPAD™ device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers (which are web browsers with small file sizes that can accommodate the reduced memory constraints of wireless networks), on other client applications accessed via the graphical displays, on client applications that do not utilize a graphical display, or the like. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device.

As referred to herein, an "interface" is generally a system by which users interact with a computing device. An interface can include an input for allowing users to manipulate a computing device, and can include an output for allowing the system to present information and/or data, indicate the effects of the user's manipulation, etc. An example of an interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of a mobile device and can be selected by, and interacted with by, a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or arrow keys for moving a cursor to highlight and select the display object.

As referred to herein, a "communication channel" is any suitable type of connection between computing devices in which data may be exchanged. For example, a communication channel may be established between computing devices via a telephone call, an email communication, a text message communication, an instant message communication, and the like.

Operating environments in which embodiments of the present disclosure may be implemented are also well-known. In a representative embodiment, a computing device, such as a mobile device, is connectable (for example, via WAP) to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the present disclosure may be implemented in other and next-generation mobile networks and devices as well. The mobile device is the physical equipment used by the end user, typically a subscriber to the wireless network. Typically, a mobile device is a 2.5G-compliant device or 3G-compliant device or a 4G-compliant device that includes a subscriber identity module (SIM), which is a smart card that carries subscriber-specific information, mobile equipment (e.g., radio and associated signal processing devices), a user interface (or a man-machine interface (MMI)), and one or more interfaces to external devices (e.g., computers, PDAs, and the like). The mobile device may also include a memory or data store.

The presently disclosed subject matter is now described in more detail. For example, FIG. 1 is a schematic diagram of a system 100 for receiving a communication specification, determining one or more contacts based on the communication specification, and initiating multiple communications with the contacts via one or more communication channels according to embodiments of the present disclosure. Referring to FIG. 1, the system 100 includes a mobile device 102, which may be any type of computing device capable of receiving communications from another device. The mobile device 102 comprises a number of functional components. This representation of the mobile device 102 is meant to be for convenience of illustration and description, and it should not be taken to limit the scope of the present disclosure as one or more of the functions may be combined. Typically, these components are implemented in software (as a set of process-executable computer instructions, associated data structures, and the like). One or more of the functions may be combined or otherwise implemented in any suitable manner (e.g., in hardware, in firmware, in combined hardware and software, or the like). The mobile device 102 may include a graphics rendering engine (not shown) for displaying information to the end user in the usual manner. The mobile device 102 is Internet-accessible and can interact with a web server 104 using known Internet protocols such as HTTP, HTTPS, and the like. The web server 104 is shown as a single device but this is not a requirement; one or more programs, processes, or other code may comprise the server and be executed on one or more machines (in one or more networked locations).

The operation of the system can be described by the following example. As shown in FIG. 1, the mobile device 102 includes various functional components and associated data stores 103 to facilitate the operation. The operation of the disclosed methods may be implemented using system components other than as shown in FIG. 1. The user may use an interface 105 of the mobile device 102 for interacting with the mobile device.

In this example system, the mobile device 102 includes a communication manager 106 configured to use a communication specification provided by a user to determine one or more contacts, and to initiate communications with the one or more contacts via one or more communication channels. For example, the communication specification may identify one or more contacts, a communication persistence parameter, a geographic location, an event, a date, a communication channel, combinations thereof, and the like, which may be used for determining one or more contacts and/or one or more communication channels in accordance with embodiments of the present disclosure. The communication manager 106 may also be configured to implement other functions described herein according to embodiments of the present disclosure.

The communication manager 106 may be one or more modules implemented with software and/or hardware configured to initiate and to receive communications (e.g., telephone calls), as well as other functions described herein. For ease of illustration, the communication manager 106 is only graphically shown in FIG. 1 as a single component of the mobile device 102; although, the communication manager 106 may be implemented with one or more combinations of hardware, software, and firmware. In an example of initiating a communication via a communication channel, a telephone call can be initiated between the mobile device 102 and another device (e.g., one of the mobile devices 108) when a call is initiated at the mobile device 102 (e.g., when a user of the mobile device 102 dials the phone number of the other device), or when the mobile device 102 receives a call originating from the other device (e.g., one of the mobile devices 108) at a geographic location. Once the call is answered at the receiving end, the call is considered to be established. The telephone call channel can be established via suitable network components, such as, but not limited to, a base station 110, an MSC 112, PSTN 114, and various other network components, which are not shown herein for ease of illustration. A wireless input/output (I/O) component 116 or any other suitable communication interface may be used for communicating data to other devices and for receiving communication data from other devices via a network (e.g., PSTN 114) as will be understood to those of skill in the art. The mobile device 102 may include an antenna 118 for wirelessly sending and receiving communications to the base station 110 or any other suitable communications unit. Other communication channels, such as, for example, email channels, text message channels, and instant message channels, may be suitably established in accordance with techniques as understood by those of skill in the art.

Figure 2:
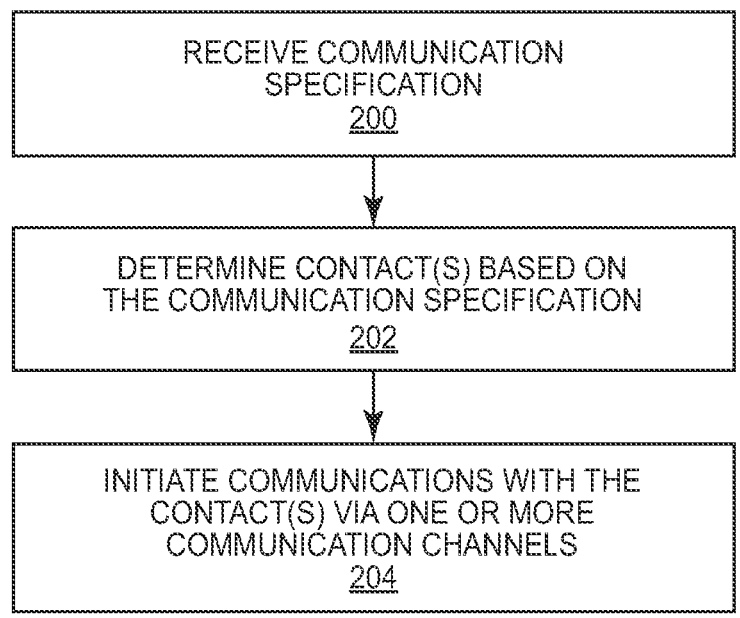
FIG. 2 is a flow chart of an exemplary method for initiating multiple communications with one or more contacts according to embodiments of the present disclosure.

FIG. 2 illustrates a flow chart of an exemplary method for initiating multiple communications with one or more contacts according to embodiments of the present disclosure. In this example, reference is made to the mobile device 102 shown in FIG. 1 for purposes of illustration; however, reference to the mobile device 102 should not be construed as limiting, and it should be appreciated that the method may be implemented by any suitable computing device.

Referring to FIG. 2, the method includes receiving a communication specification (step 200). For example, the communication specification may include identification of one or more of a contact(s), a communication persistence parameter, a geographic location, an event, a date, and a communication channel. The user of the mobile device 102 may use the interface 105 for specifying the communication specification. For example, the user may select a contact group, event, location, or the like. The communication manager 106 may suitably store data that specifies the communication specification in the data store 103.

Figure 3:
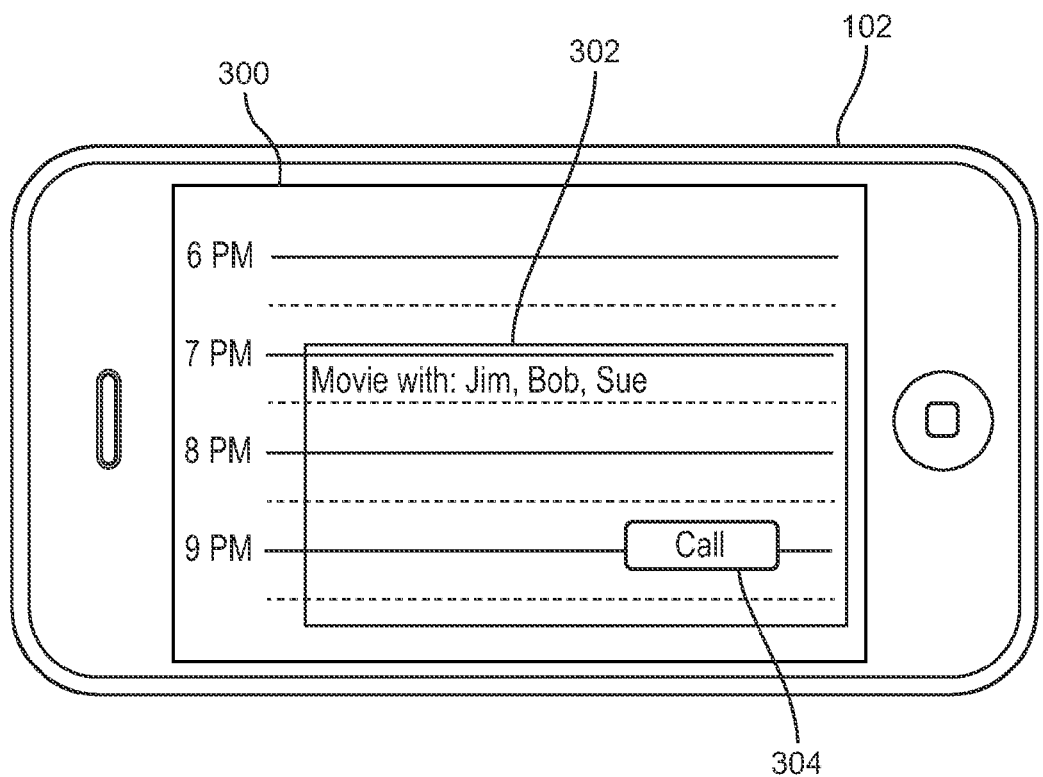
FIG. 3 is a front view of an exemplary mobile device including a touch screen display for displaying indicia of an event specified by a user using a calendar application according to embodiments of the present disclosure.

As an example of receiving a communication specification, FIG. 3 illustrates a front view of an exemplary mobile device 102 including a touch screen display 300 for displaying indicia 302 of an event specified by a user using a calendar application. Referring to FIG. 3, the event is a movie with contacts Jim, Bob, and Sue. In an example, the user may, prior to the time of the event, decide not to attend due to illness or other reason. As a result, the user may desire to let at least one contact know that he will not attend. To initiate a communication to the group of contacts, the user may touch the "Call"

icon 304. In response to touch of the icon 304, the communication manager 106 may determine that Jim, Bob, and Sue are associated with the event and initiate communications with at least one of the contacts in accordance with embodiments of the present disclosure.

Figure 4:
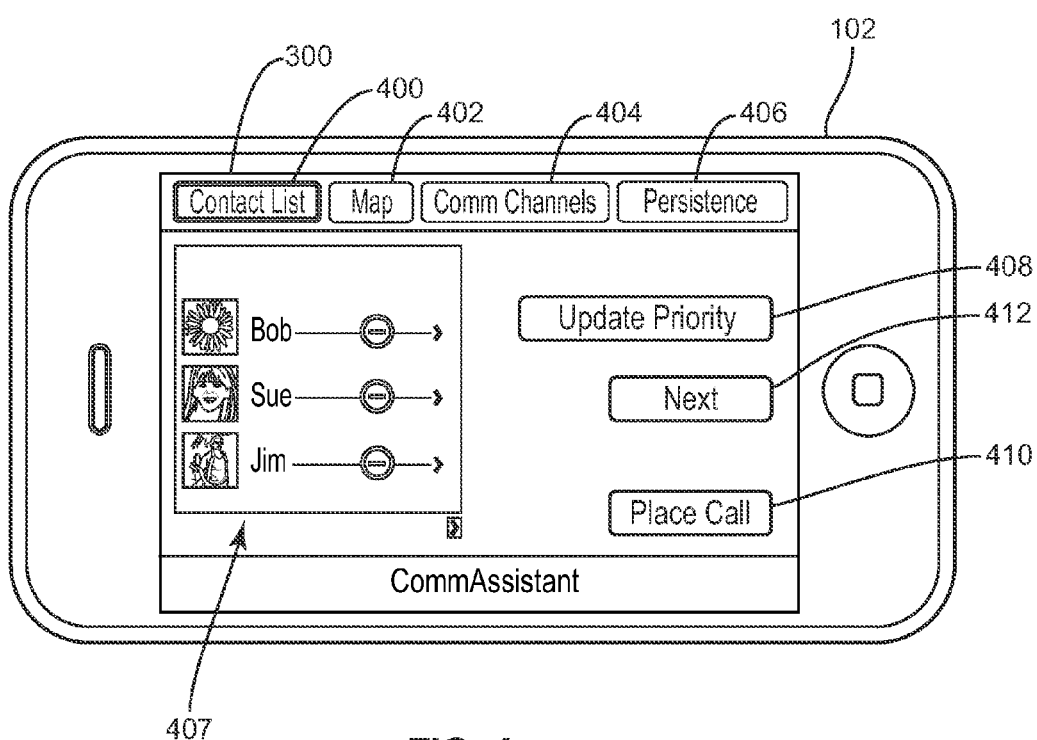
FIG. 4 is a front view of an exemplary mobile device for allowing a user to modify default settings of a communication specification for a group call to multiple contacts according to embodiments of the present disclosure.

In a further example of receiving a communication specification, FIG. 4 illustrates a front view of the mobile device 102 shown in FIG. 1 for allowing the user to modify default settings of the communication specification for a group call to contacts Jim, Bob, and Sue. For example, referring to FIG. 4, the display 300 shows a "Contact List" icon 400, a "Map" icon 402, a "Comm Channels" icon 404, and a "Persistence" icon 406. The "Contact List" icon 400 has been selected in this step of changing the settings. In this step, the contacts in the group and a priority level for the contacts can be modified. The display interface and the icons represent a user interface guide that may be presented to a user for prompting user input into the user interface guide for specifying a communication specification in accordance with embodiments of the present disclosure. The display 300 shows indicia, generally designated 407, for the contacts Bob, Sue, and Jim. The user may suitably touch portions of the display 300 and/or otherwise suitably interact with the interface 105 to change or remove the contacts or add other contacts stored in a contact list on the mobile device 102. A priority order in which the contacts are to be contacted in a communication with the group may be set by selecting an "Update Priority" icon 408 or by otherwise suitably interfacing with the interface 105. A "Place Call" icon 410 may be selected for initiating communication(s) with the group. If additional modifications are desired by the user, a "Next" icon 412 may be selected for moving to a next step for modifying the default settings.

Figure 5:
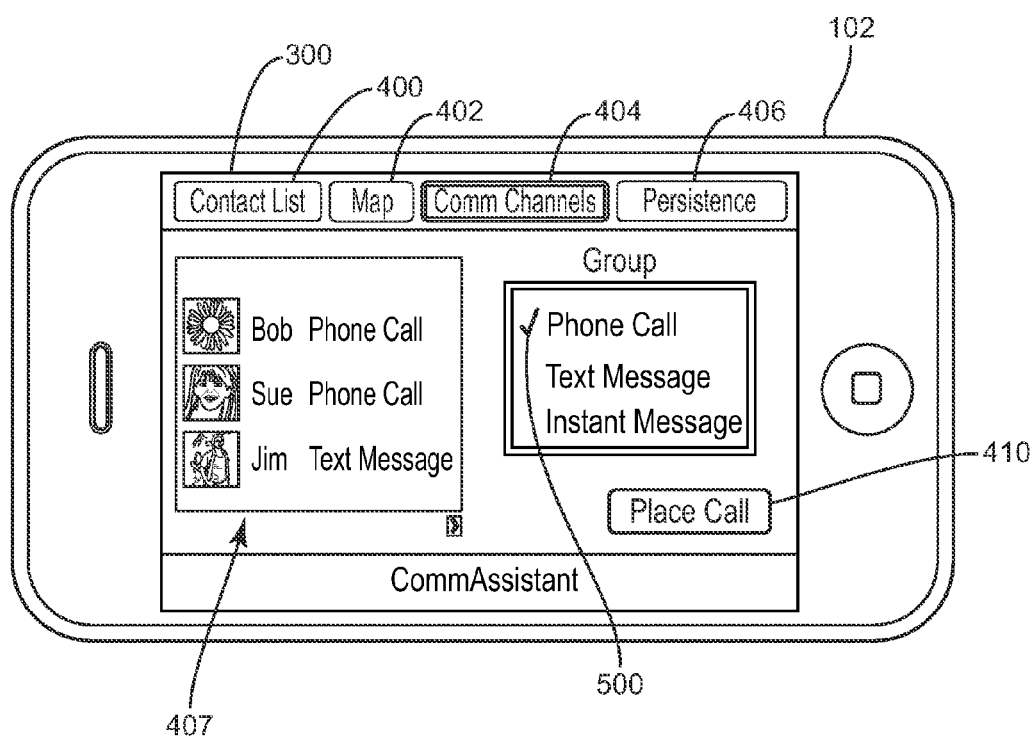
FIG. 5 is a front view of an exemplary mobile device in a mode for changing communication channels for communicating with a group according to embodiments of the present disclosure.

In a further example of changing settings of a communication specification, FIG. 5 illustrates a front view of the mobile device 102 in a mode for changing communication channels for communicating with the group. In this example, the "Comm Channels" icon 404 has been selected. The user may touch the display 300 for selecting one or more of the contacts Bob, Sue, and Jim and for selecting one or more communication channels for communicating with the selected contact(s). For example, the user may touch an area of the display 300 on or around the contact Bob for selecting the contact. Next, display 300 will indicate channels associated with the selected contact via a "check" indicia 500. In this example, a phone call is associated with the contact as indicated by the check indicia 500. The user may touch the check indicia 500 to remove that communication channel for the contact, or touch an "unchecked" communication channel, such as near "Text Message" or "Instant Message," for adding the communication channel.

Figure 6:
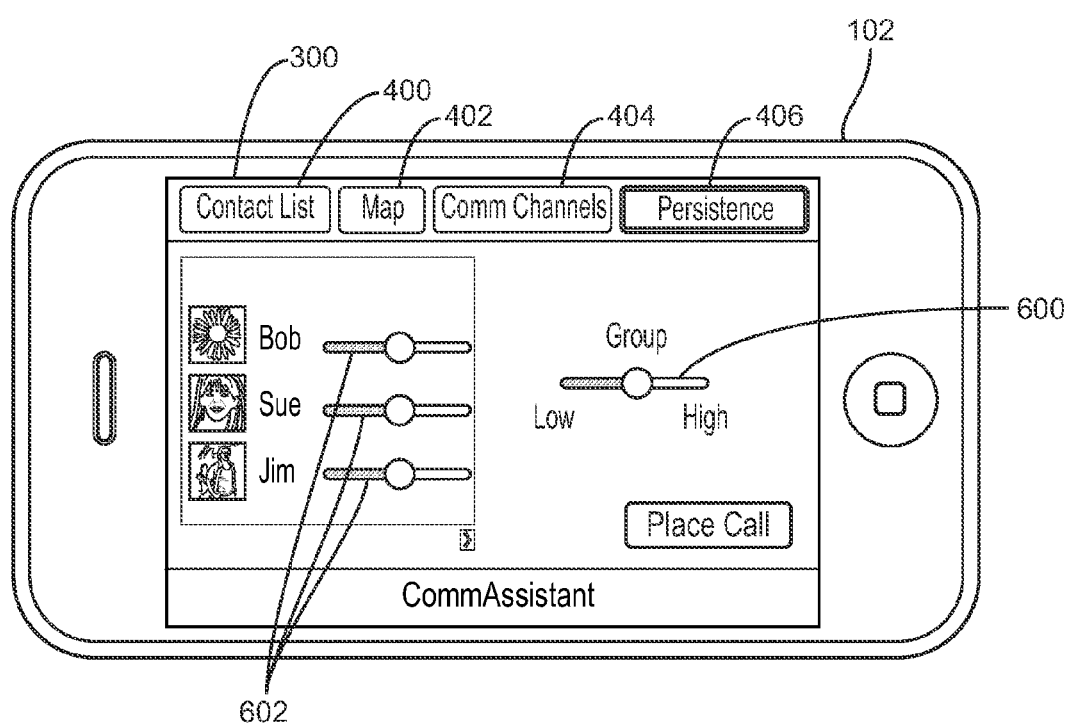
FIG. 6 is a front view of an exemplary mobile device in a mode for changing communication persistence parameters for communicating with a group according to embodiments of the present disclosure.

In yet another example of changing settings of a communication specification, FIG. 6 illustrates a front view of the mobile device 102 in a mode for changing communication persistence parameters for communicating with the group. A communication persistence parameter may include, but is not limited to, a number of communication attempts for connecting to a contact and a number or type of communication channels (e.g., calling, emailing, and text messaging) used for connecting to the contact. The higher the number of attempts and/or number of communication channels used for communicating with a contact is associated with a higher persistence level. Referring to FIG. 6, the user may touch a "Group" slide 600 for setting a communication persistence parameter for the entire group of contacts. The slide 600 may be moved to the left or right for setting the parameter. Persistence for each of the contacts may be individually adjusted by moving a slide 602 for a respective contact.

The settings of the communication specification for the group may be suitably stored in a computing device. For example, the settings may be stored in the data store 103 of the mobile device 102. Prior to initiating communication with a group in accordance with embodiments of the present disclosure, the communication manager 106 may access the stored settings for use in initiating communications with the group.

Now referring again to FIG. 2, the method includes determining one or more contacts based on the communication specification (step 202). For example, the communication specification stored in the data store 103 may specify contacts. For example, the contacts Bob, Sue, and Jim in the above example may be identified in a communication specification. The communication manager 106 may suitably access the data store 103 for retrieving the contacts, including information for communicating with the contacts, such as, but not limited to, telephone numbers, email addresses, and the like. The communication manager 106 may retrieve the communication information needed for communicating with the contacts from a contact list, or in any other suitable manner.

The method of FIG. 2 also includes initiating communications with the contact(s) via one or more communication channels (step 204). For example, in addition to contacts, the communication specification may specify communication channels (e.g., telephone, email, text messaging, and the like) for communicating with the contacts. Using the specified communication channels, the communication manager 106 may initiate communications with the contacts via the communication channels. The communications with the contacts may be implemented in accordance with the communication specification. For example, the communications may be ordered in accordance with the specified priority order for communicating with the contacts. Further, for example, the communications may be implemented in accordance with a communication persistence parameter specified by the communication specification.

Continuing the aforementioned example of communicating with contacts Jim, Bob, and Sue associated with a specified event, the communication manager 106 may access telephone numbers for the contacts and may use the telephone numbers for initiating calls to the contacts in a specified order or simultaneously. In an example, Bob may be the first contact to answer a call. The user may then speak with Bob about the event. In response to one of the contacts answering, the communication manager 106 may terminate the other calls to Jim and Sue. Bob may then use his computing device for communicating information about the event in accordance with embodiments of the present disclosure. For example, FIG. 7 illustrates a flow chart of an exemplary method for allowing a recipient of a communication from an originator of a group communication to initiate communications with one or more of the other contacts associated with the group communication.

Figure 7:
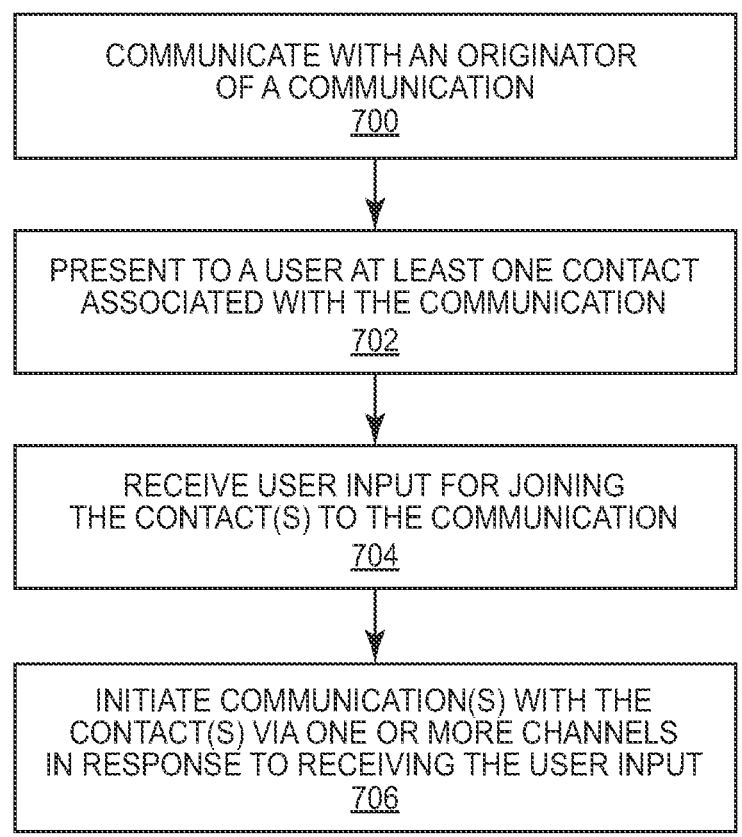
FIG. 7 is a flow chart of an exemplary method for allowing a recipient of a communication from an originator of a group communication to initiate communications with one or more of the other contacts associated with the group communication according to embodiments of the present disclosure.

The method of FIG. 7 may be implemented by a communication manager residing on a mobile device that is a recipient of one of the communications to a group of contacts in accordance with embodiments of the present disclosure. For example, the mobile device 102 shown in FIG. 1 may initiate communications to several other mobile devices 108. Referring to FIG. 7, a mobile device may communicate with an originator of a communication (step 700). For example, one or more of the mobile devices 108 may receive a group communication as described herein and may include a communication manager 106 configured to implement functions in accordance with the present disclosure. Continuing the aforementioned example of the group communication associated with Bob, Sue, and Jim, the recipient of a group communication is Bob, who may be a user of one of the mobile devices 108.

The method of FIG. 7 includes presenting to a user one or more contacts associated with a communication (step 702). For example, the mobile device 108 used by Bob may display identifiers for other contacts associated with the group communication initiated by mobile device 102. The mobile device 108 may have stored in a data store the identifiers for the other contacts, or receive such information from the mobile device 102. In accordance with embodiments of the present disclosure, the mobile device 108 may be aware of other contacts involved in the group communication. In an example, regardless of the communication channel, the mobile device 102 of the message originator may send the contact information directly to each recipient's mobile device 108. This example may be implemented as a direct peer-to-peer communication between client applications running on the mobile devices. The communication manager 106 on the recipient's mobile device 108 may receive the contact information, store the information, and display the information to the user immediately or upon request. In another embodiment of the present disclosure, the technique of communicating the contact information may vary depending on the type of communication channel. For example, if the communication channel is a text message or an instant message, the contact information may be embedded within the message or sent as a subsequent message.

Figure 8:
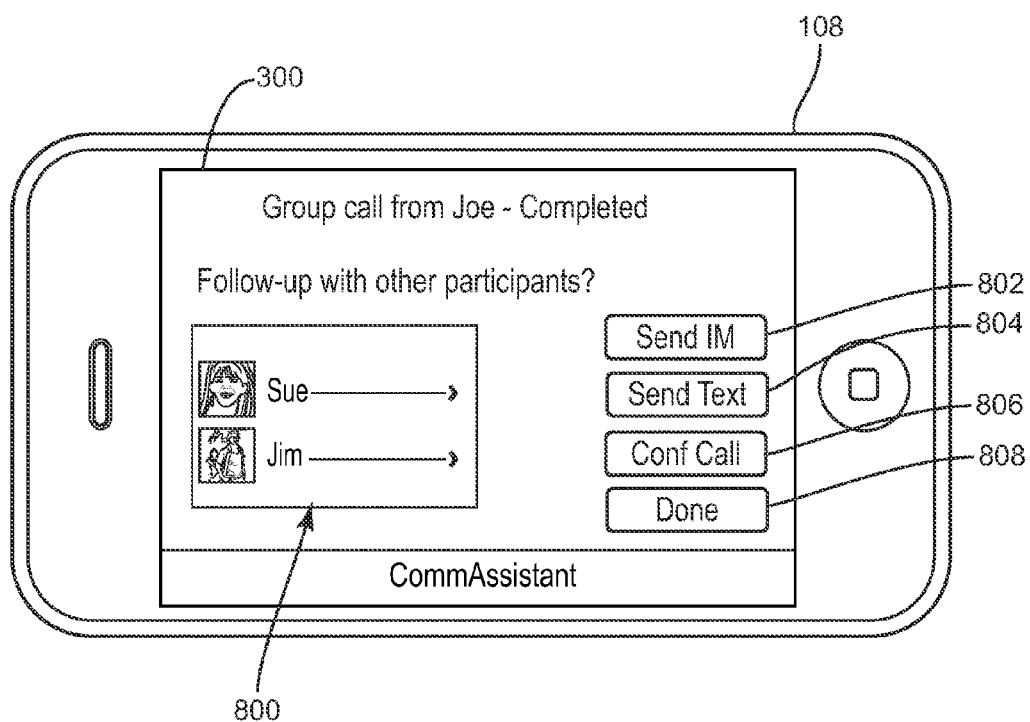
FIG. 8 is a front view of an exemplary mobile device including a display for displaying identifiers for other contacts associated with a group communication initiated by a mobile device according to embodiments of the present disclosure.

FIG. 8 illustrates a front view of the mobile device 108 including a display 300 for displaying identifiers for other contacts associated with the group communication initiated by mobile device 102. Referring to FIG. 8, indicia 800 for Sue and Jim, the other contacts associated with the group, are displayed. The display 300 may also display text indicating that the group call from Joe has completed, and text querying whether to follow up with other contacts (or participants). Thus, the display 300 may present one or more contacts associated with the group call.

Referring again to FIG. 7, the method may include receiving user input for joining the contact(s) to the communication (step 704). For example, the user may use the interface 105 for selecting one or more of the contact identifiers to join the selected contacts to a communication.

In the example of FIG. 8, the user may touch one or both of the contacts (i.e., Sue and Jim) to select the contact for joining a communication. The user may also touch one or more of a "Send IM" icon 802, a "Send Text" icon 804, and a "Conf Call" icon 806 for selecting a communication channel for joining selected contact(s) to the communication. For example, by selecting the "Send IM" icon 802, instant message communication to the selected contact(s) may be initiated. In another example, by selecting the "Send Text" icon 804, text messaging communication to the selected contact(s) may be initiated. In another example, by selecting the "Conf Call" icon 806, a telephone conference call communication to the selected contact(s) may be initiated. When the user desires to exit this display screen, he or she may select the "Done" icon 808.

Referring to FIG. 7, the method may include initiating one or more communications with the contact(s) via one or more channels in response to receiving the user input (step 706). For example, continuing the example of FIG. 8, one of the mobile devices 108 may initiate communication(s) to selected contacts (e.g., Sue and/or Jim) via the selected communication channel(s) (e.g., instant messaging, text messaging, and/or telephone call). The communication(s) may be initiated in response to the user touching one or more of the icons 802, 804, and 806.

Figure 9:
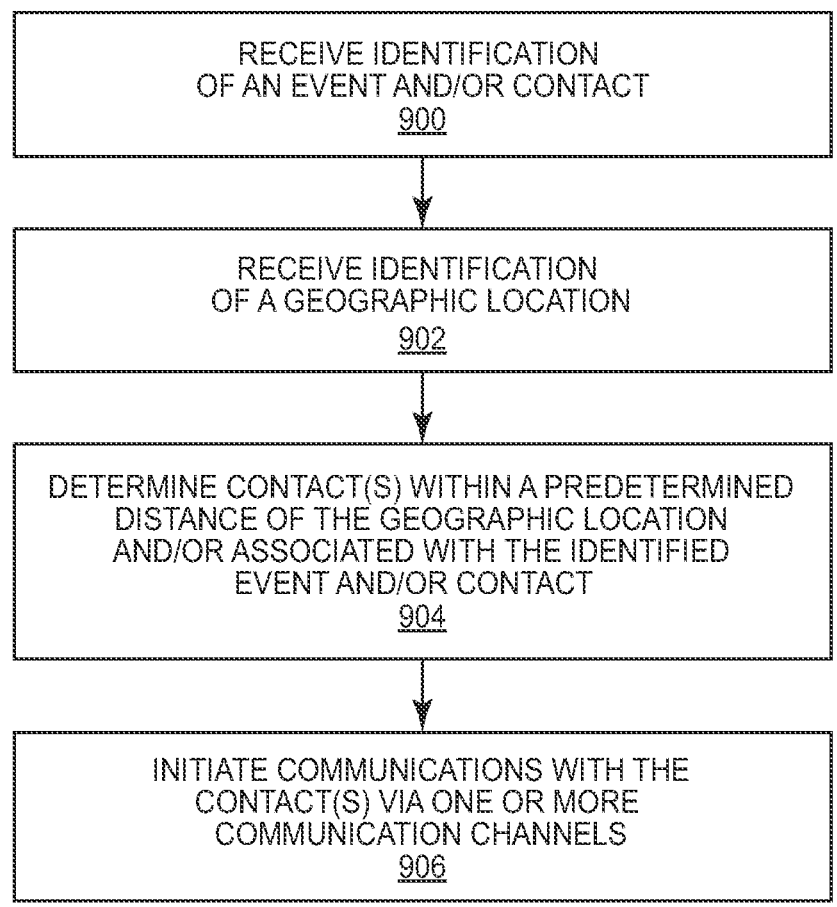
FIG. 9 is a flow chart of an exemplary method for dynamically generating a contact group according to embodiments of the present disclosure.

In accordance with embodiments of the present disclosure, the communication manager 106 may dynamically generate a contact group based on an identified event and/or contact. For example, FIG. 9 illustrates a flow chart of an exemplary method for dynamically generating a contact group according to embodiments of the present disclosure. The method may be implemented, for example, by the communication manager 106 of the mobile device 102.

Referring to FIG. 9, the method includes receiving identification of an event and/or contact (step 900). For example, a user of a mobile device, such as mobile device 102 shown in FIG. 1, may interact with the mobile device to identify an event specified via a calendar application. The event may be associated with one or more contacts. In another example, the user of a mobile device may interact with the mobile device to identify one or more contacts stored in a contact management application. The mobile device user may desire to communicate with a group of contacts associated with the identified event and/or identified contact. In an example use, the mobile device user may be involved in an emergency event and desire to efficiently communicate with others about the emergency.

In an example of receiving identification of a contact, the mobile device user may launch a contact application and select a particular contact entry. When the selected contact entry is presented on a display of the mobile device, the display may also display a "Find related contacts" icon that may be selected for presenting to the user one or more other contacts associated with the selected contact. The associated contacts may be contacts who have been specified as friends of the selected contact. In an example, the associated contacts may be specified as "related" to the selected contact when the selected contact's address book was imported to the address book of the user's mobile device. Friends may be identified by use of a social networking service, such as, but not limited to, the FACEBOOK® social networking service.

The method of FIG. 9 includes receiving identification of a geographic location (step 902). For example, the user of a mobile device may desire to filter contacts based on a specified geographic location. The user may interface with a mapping application residing on the mobile device to select a position on a displayed map, enter an address, or specify coordinates for identifying the geographic location. In an example, the user may identify a physical location (e.g., a business or school) and specify a distance from the school such that the geographic location will be identified as the physical location and an area within the specified distance from the physical location.

The method of FIG. 9 includes determining one or more contacts within a predetermined distance of the geographic location, and/or one or more contacts associated with the identified event and/or contact (step 904). In an example of determining contacts within the predetermined distance of the geographic location, the communication manager 106 shown in FIG. 1 may use the identified geographic location from step 902 for finding contacts within the identified geographic location. For example, contacts may share their geographic location with the mobile device 102, and this information may be stored in the data store 103. In another example, contacts may utilize a location sharing service, such as, but not limited to, GOOGLE® Latitude or LOOPT® applications, and the mobile device 102 may query the service to discover their location. The identified geographic location may be compared to the geographic location information provided by the contacts or a server for determining whether the contacts are within the geographic location, or a predetermined distance from the geographic location.

Figure 10:
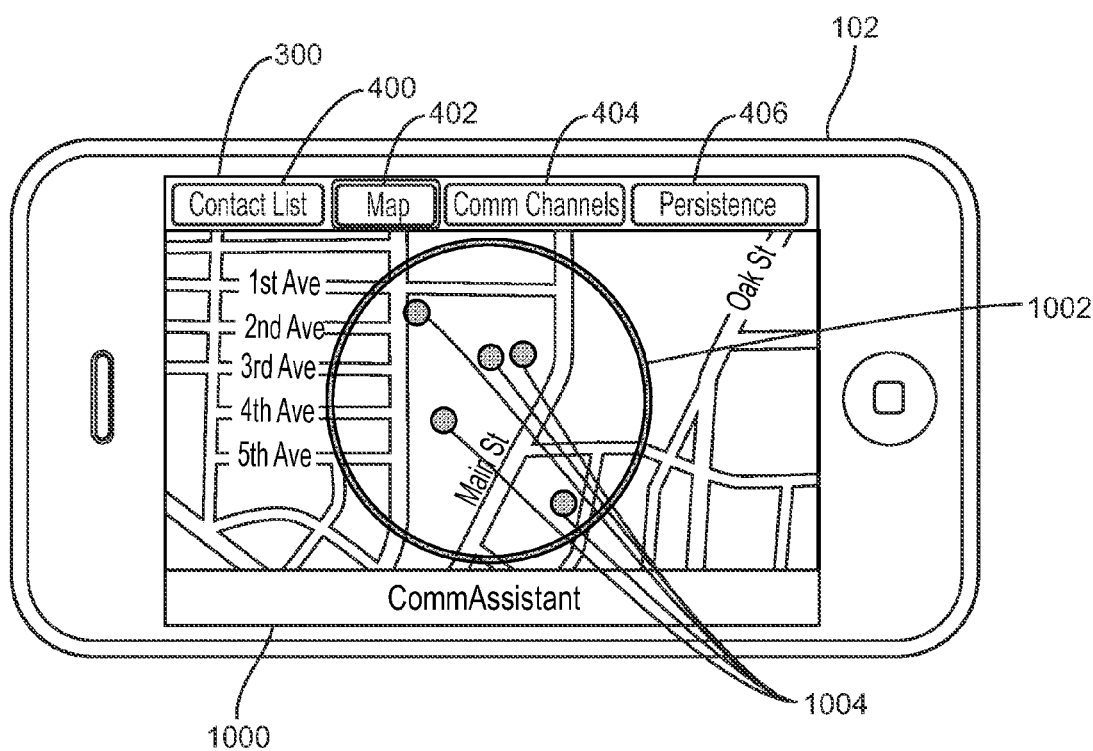
FIG. 10 is a front view of an exemplary mobile device including a touch screen display for displaying a graphical representation of a map according to embodiments of the present disclosure.

In another example of determining contacts within the predetermined distance of the geographic location, a map application may control the mobile device to display a map. The map may also specify current geographic locations of contacts. For example, FIG. 10 illustrates a front view of an exemplary mobile device 102 including the touch screen display 300 for displaying a graphical representation 1000 of a map. Such a graphical representation of a map may be displayed and enabled for operation in accordance with embodiments of the present disclosure by touching the "Map" icon 402. The "Map" icon 402 may be selected for specifying a geographic location and/or contacts that may be used in accordance with embodiments of the present disclosure. Particularly, for example, the user may interact with the map representation 1000 (e.g., by touch) for controlling a size and dimension of a shape 1002 to specify a geographic location. Although the shape 1002 is depicted as a circle shape in the figure, it may alternatively be any other suitable shape. The geographic location may be the area inside the shape 1002 and/or areas within a predetermined distance of the shape 1002. In response to the user specifying the shape 1002, current locations 1004 of contacts within or near the specified geographic location may be displayed. The user may interact with the mobile device 102 to select the contacts in accordance with embodiments of the present disclosure.

Returning to FIG. 9, in an example of determining contacts associated with the identified event and/or contact, the contacts may be those contacts identified as attending or otherwise participating in the event identified in step 900. The contacts associated with the identified contacts may be, for example, but not limited to, contacts specified as friends of the identified contacts.

The method of FIG. 9 may include initiating communications with the contact(s) via one or more communication channels. For example, communications in accordance with embodiments of the present disclosure may be initiated with the contacts determined in step 904. Further, for example, the communications may be in accordance with communication persistence parameters, communication channels, and/or other factors specified by the user in accordance with embodiments of the present disclosure.

According to embodiments of the present disclosure, a user of the mobile device 102 may use an application (often referred to as an "app") residing on the mobile device 102 to interact with the communication manager 106 via the interface 105 for implementing the functions according to embodiments of the present disclosure. The application may reside on the mobile device 102 and may be a part of the communication manager 106. The user may, for example, input commands into the interface 105 for specifying, for example, contacts, events, and geographic locations in accordance with embodiments of the present disclosure. The application may have been downloaded from a web server, such as a server 104, and installed on the mobile device 102 in any suitable manner. The application may be downloaded to another machine (such as the mobile phone user's PC) and then transferred to the mobile device over a medium such as a Bluetooth connection. In an example, the application can enable the mobile device 102 with one or more of the features according to embodiments of the present disclosure.

In accordance with embodiments of the present disclosure, contacts and/or communication channels may be dynamically generated. For example, a user may select one or more contacts and, in response to the selection, communications to the contacts may be initiated by a mobile device. In another example, a user may select a calendar event and, in response to the selection, communications to contacts associated with the event may be initiated by a mobile device. In another example, a user may select a geographic location and, in response to the selection, communications to contacts located at the geographic location or in proximity to the geographic location may be initiated by a mobile device. In yet another example, a user may select a contact and, in response to the selection, communications to contacts associated with the selected contact may be initiated. The contacts may be associated with communication channels (e.g., a contact entry for the contact may specify phone numbers and email addresses), and communications with the contacts via these communication channels may be automatically initiated. The communication manager 106 may be configured to automatically monitor for these selections and to prompt a user to authorize initiation of the communications. In response to authorization from a user, the communications may be initiated.

In accordance with embodiments of the present disclosure, a contact may be associated with various identifiers for communicating with the contact. For example, an entry for a contact in an address book may specify a primary telephone number, one or more alternate telephone numbers, and identifications for other communication channels (e.g., email address, instant messaging identification, social networking identification, and the like). Further, the entry may specify a preferred communication channel. When a communication is initiated to the contact in accordance with embodiments of the present disclosure, the preferred communication channel may be used for communicating with the contact. The preferred communication channel may be overridden by the communication originator and/or the communication manager 106 based on known availability/presence of the user on a communication channel. For example, if the user is known to be available on a communication channel, such as by having a status for an instant messaging application set to "available", this communication channel may be used rather than the preferred communication channel for communicating with the contact.

In accordance with embodiments of the present disclosure, contact groups (e.g., members of a household, a group of friends, etc.) may be specified by the user for communications. Further, the contacts may be prioritized or otherwise ordered for communications when communications to the group are initiated.

In accordance with embodiments of the present disclosure, the communication manager 106 may attempt to consolidate communications by searching for communication channels that are common to two or more contacts in the contact group. For example, spouses may share a common telephone number, such as their house telephone. This common communication channel may be used for communicating to the two or more contacts. This common communication channel may be used as opposed to any preferred communication channel for the contacts. After attempting communication to the contacts on this common communication channel, the other channels associated with the contacts may be used for communications.

The communication manager 106 may perform optimizations of communications based on previous communications to a contact. For example, the communication manager 106 may learn, based on previous communications, that a communication channel is likely to not be answered or encounter an answering service. In this example, this communication channel may be prioritized last among the communication channels available for a contact. In another example, the communication manager 106 may learn that response to a particular communication channel is likely to be the quickest among the communication channels specified for a contact. In this example, this communication channel may be prioritized first among the communication channels available for a contact. In yet another example, the communication manager 106 may determine the priority of a communication channel based on the current context of the contact. For instance, a contact located in an area having poor cellular signal reception may assign a lower priority to a cellular communication channel. The communications may be performed in a sequential mode or a parallel mode depending upon urgency, for example.

Figure 11:
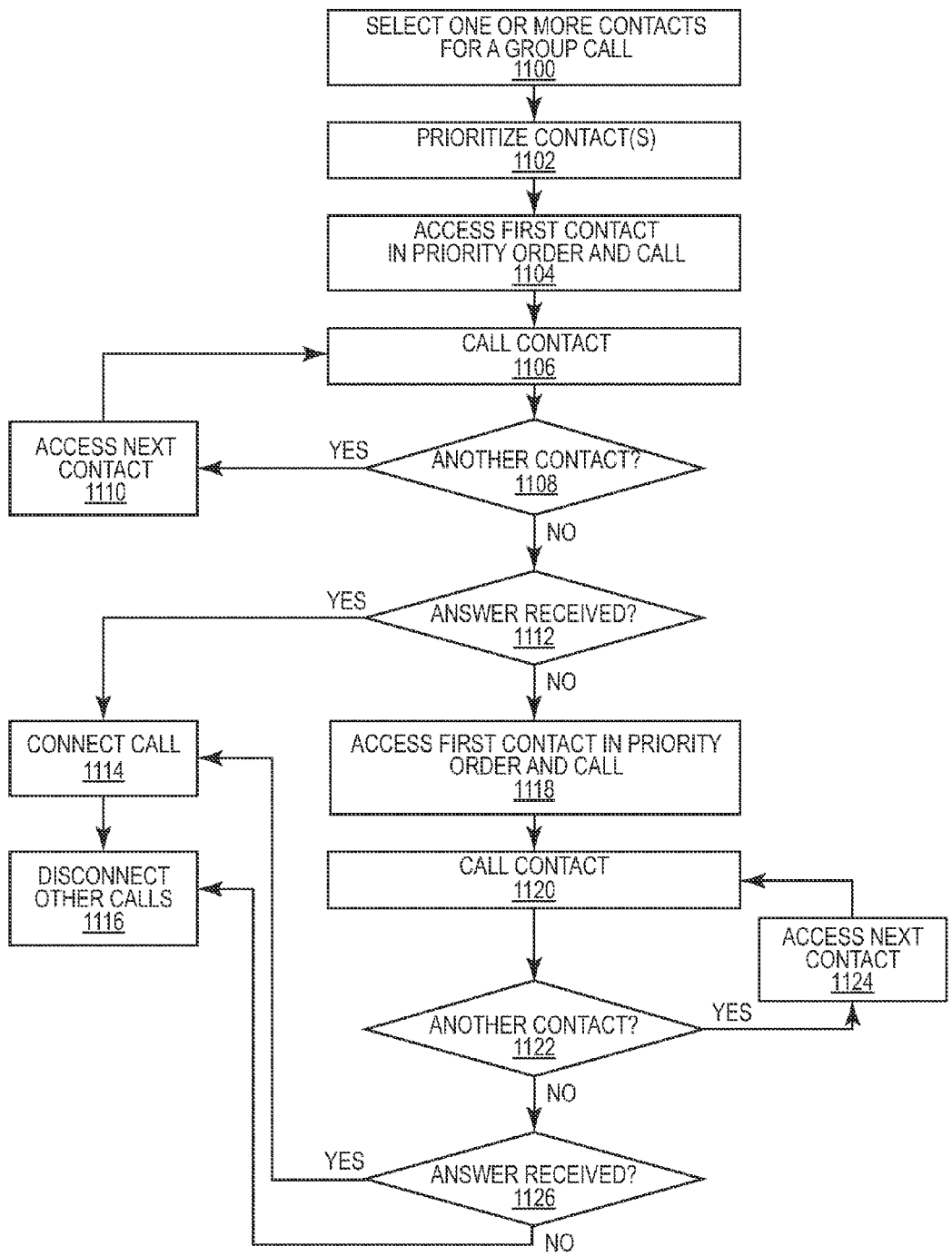
FIG. 11 is a flow chart of an exemplary method for initiating multiple communications according to embodiments of the present disclosure.

In accordance with embodiments of the present disclosure, a plurality of communications may be initiated with one or more contacts, and, when one of the communications is accepted, one or more of the other communications may be discontinued. For example, FIG. 11 illustrates a flow chart of an exemplary method for initiating multiple communications according to embodiments of the present disclosure. In this example, reference is made to the mobile device 102 shown in FIG. 1 for purposes of illustration; however, reference to the mobile device 102 should not be construed as limiting, and it should be appreciated that the method may be implemented by any suitable computing device.

Referring to FIG. 11, the method includes selecting one or more contacts for a group call (step 1100). For example, the user of the mobile device 102 may use the interface 105 to select one or more contacts in an address book. The communication manager 106 may initiate the group call in response to selection of the contact(s) and implement some or all of the steps of this exemplary method. Although this example is in the context of telephone communication, the example is similarly applicable to the various other communication channels described herein. The communication manager 106 may work together with an appropriately-configured server, such as the server 104, for implementing the steps described herein, including the steps of communicating in parallel to other mobile devices 108.

The method includes prioritizing the selected contact(s) (step 1102). The ordering of the communications with the contacts may be set by the mobile device user. Alternatively, the ordering may be implemented by the communication manager 106 in accordance with embodiments of the present disclosure. Next, the first contact in the priority order is accessed (step 1104), and a preferred/optimal telephone number is obtained and a call to the contact initiated using the telephone number (step 1106). The priority order may correspond to a preferred order in which communications to contacts is initiated. For example, the contacts may be ordered and communications to them initiated in a predetermined order for sequential communication to the contacts. Alternatively, communications to the contacts may be initiated simultaneously. In another alternative, the contacts may be categorized in subsets, which may be given a priority order. In this alternative, communications with contacts within the same subset are initiated simultaneously.

At step 1108, the method includes determining whether another contact is in the group. In response to determining that there is another contact, the next contact in the list is accessed (step 1110), and the next contact is called in a return to step 1106.

In response to determining that there is no other contact in the group, the method includes determining whether an answer to any call is received (step 1112). The communication manager 106 may check for the call answers for a predetermined time period before determining that there is no answer to the calls. The calls may be reinitiated a predetermined number of times until at least one of the calls is accepted. In response to determining that there is an answer to a call, the answered call can be connected (step 1114). In an embodiment, in response to determining that there is an answer to a call, the other contacts may be notified that the call has been accepted by a suitable communication channel. Next, at step 1116, the other calls may be disconnected. Thus, the other call attempts may be canceled, and the call attempt histories may be deleted.

In response to determining that there is no answer to the calls, the first contact in the list may be accessed (step 1118) and an alternate telephone number for the contact number may be retrieved and a call to the contact initiated using the alternate telephone number (step 1120). In an example, the first contact may be the first contact in a priority order for sequential communication as described herein. In an alternative example, communications may be simultaneous to the contacts, or in accordance with contact subsets as described herein.

After step 1120, the method may include determining whether there is another contact (step 1122). In response to determining that there is another contact, the next contact in the list is accessed (step 1124), and the next contact is called in a return to step 1120. In response to determining that there is no other contact in the group at step 1122, the method includes determining whether an answer to any call is received (step 1126). If an answer is received, the process proceeds to step 1114. If no answer is received, the process proceeds to step 1116. It should be noted that although this example is based on calls, any other suitable communication channel or combination of communication channels may be utilized.

In accordance with embodiments of the present disclosure, when a communication (e.g., a telephone call) is answered by one of the contacts in a group communication, the communications to the other contacts may be disconnected. If two or more of the contacts answer before the communication is disconnected, the communication manager 106 may control the communications systems of the mobile device 102 to join the answering contacts in a conference call. As another example, if the communications are instant messages, the communication manager 106 may control the communications systems of the mobile device 102 to join the answering contacts in an instant messaging session. In a further example, if there is an active telephone call and an instant messaging session, the telephone call may be left open, and a second instant message may be sent to the other contact to notify the respective contact that the originator of the instant message is involved in a telephone call, and it may specify the participants of the telephone call.

In accordance with embodiments of the present disclosure, a persistence level for a communication persistence parameter may be assigned for a contact group as a whole, or individually to members of the contact group. A "high" persistence level may be associated with the following processes for communicating with a group: attempt all contacts simultaneously; attempt all communication channels simultaneously together or in part; and, if no response to communications, reinitiating the communications after a predetermined time period. A "low" persistence level may be associated with the following processes for communicating with a group: attempt one contact, one communication channel at a time; try only one communication channel per user (e.g., try the most likely communication channel for reaching the contact); and not attempting another communication attempt for one or more of the contacts. Any of these tactics for communicating may be specified and/or configured by a mobile device user.

In accordance with embodiments of the present disclosure, communications initiated in connection with a group communication may be terminated if one or more contacts answer, and the histories of the communications may be deleted. Further, for example, a message may be automatically sent to such contacts indicating that further communication is unnecessary. In an example of terminating an instant messaging communication, the originator may send another instant message, which when received by the recipient, removes the previous instant message and the current instant message.

In accordance with embodiments of the present disclosure, users may have multiple communication channels available for communicating with one or more contacts in a group. The communication channels may be prioritized based on, for example, but not limited to, known presence information, historical information, a likelihood of making contact using the communication channel, and a current context of the user (e.g., driving an automobile).

Figure 12:
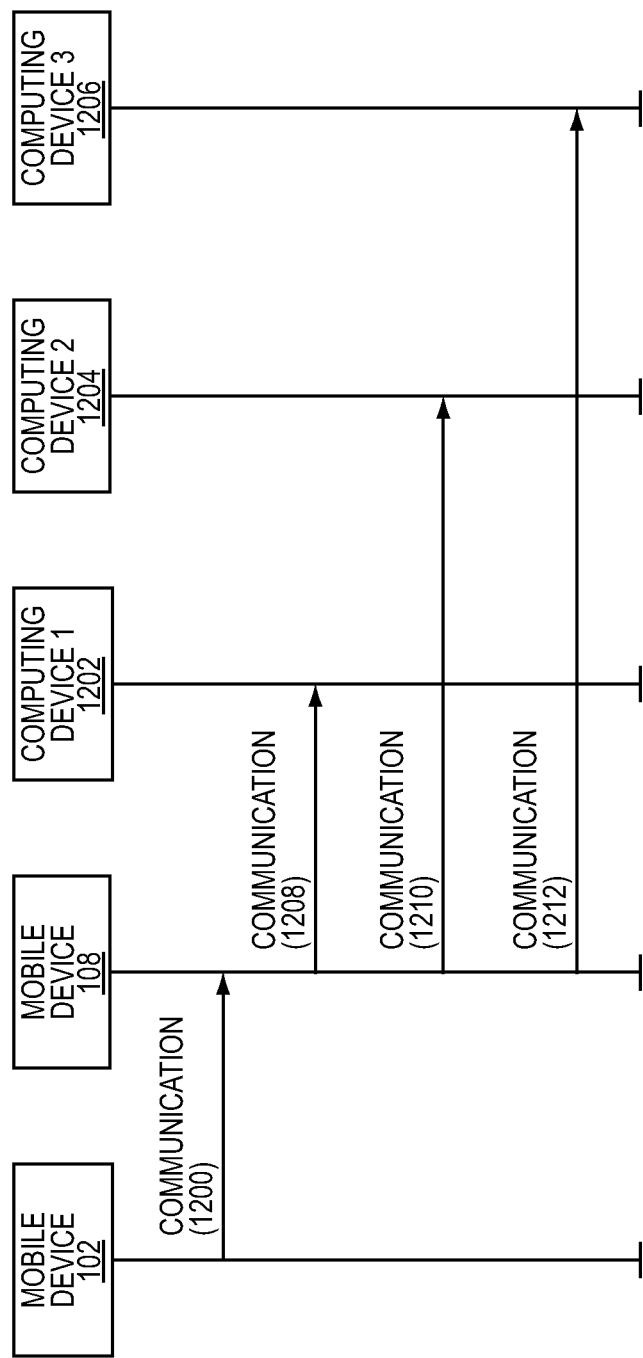
FIG. 12 is a message flow diagram of an exemplary operation of the system of FIG. 1 according to embodiments of the present disclosure.

FIG. 12 illustrates a message flow diagram of an exemplary operation of the system of FIG. 1 according to embodiments of the present disclosure. Referring to FIG. 12, the mobile device 102 may initiate a group communication including initiating a communication to the mobile device 108 (step 1200). In this example, the mobile device 102 originates the communication. The group communication may also include the initiation of communications to other computing devices (not shown). In accordance with embodiments of the present disclosure, contacts associated with the group communication may be presented to the user of the mobile device 108. The mobile device 108 may be aware of other contacts involved in the group communication. In response to receiving the communication and determining contacts associated with the group communication, the mobile device 108 may present the contacts to a user of the mobile device 108 for requesting user input about whether to join the contacts in a group communication. The user may use an interface of the mobile device 108 for selecting to join the contacts in a group communication. In response to receiving the user input to join the contacts in the group communication, the mobile device 108 may initiate communications 1208, 1210, and 1212 with computing devices 1202, 1204, and 1206, respectively, for joining the mobile devices in a group communication, such as, but not limited to a group call. As an example, if one or more computing devices 1202, 1204, and 1206 are mobile telephones, the telephone numbers of these computing devices may be identified in a contact list residing on the mobile device 108. The computing devices may be, but are not limited to, mobile devices, computers, smart phones, cell phones, PDAs, and the like.

Figure 13:
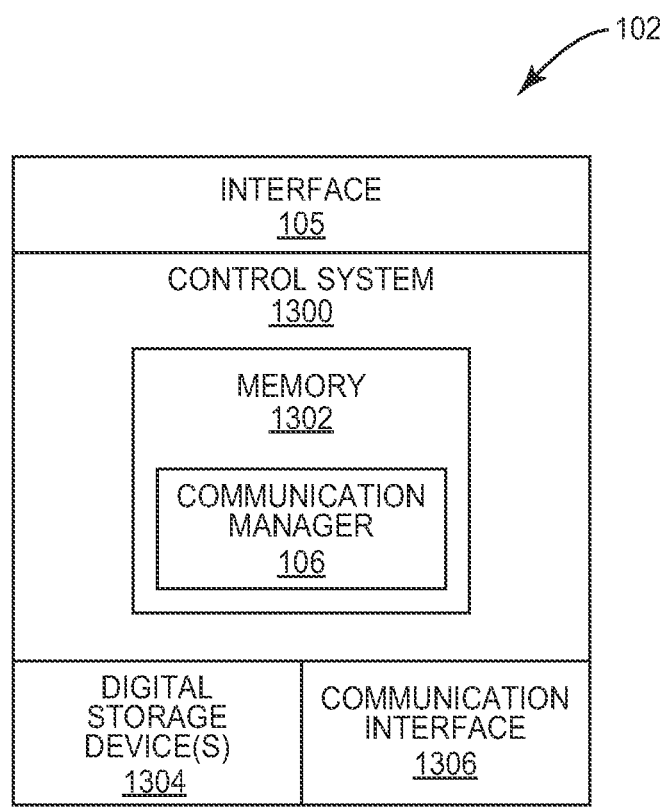
FIG. 13 is a block diagram of the mobile device 102 shown in FIG. 1 according to embodiments of the present disclosure.

FIG. 13 is a block diagram of the mobile device 102 shown in FIG. 1 according to embodiments of the present disclosure. Referring to FIG. 13, the mobile device 102 may include a control system 1300 having associated memory 1302. In this example, the communication manager 106 is implemented in software and stored in the memory 1302. However, the present disclosure is not limited thereto. The communication manager 106 may be implemented in software, hardware, or a combination thereof. In addition, the mobile device 102 may include one or more digital storage devices 1304 such as, for example, one or more hard disk drives. The mobile device 102 may also include a communication interface 1306 communicatively coupled to the base station 110 shown in FIG. 1. The mobile device 102 may also include the user interface 105, which may include components such as, for example, a display, one or more user input devices, or the like.

The various techniques described herein may be implemented with hardware or software or, where appropriate, with a combination of both. For example, the mobile device 102 shown in FIG. 1 may include suitable hardware, software, or combinations thereof configured to implement the various techniques described herein. The methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
   at a computing device:
   receiving an input that specifies an event;
   determining a plurality of contacts based on the specified event;
   in response to the input, initiating a plurality of communications with the plurality of contacts;
   determining whether an acceptance to any of the plurality of communications has been received;
   in response to determining that acceptance to any of the communications has been received:
   communicating with the contact associated with the one of the communications that has been received; and
   discontinuing the other initiated communications;
   determining that one of the communications has been accepted by a first recipient device associated with a first contact; and in response to determining that one of the communications has been accepted, notifying a second recipient device associated with a second contact of the accepted communication, wherein the specified event is associated with a first contact, wherein the method further comprises determining a geographic relationship between the first contact and a second contact, and wherein initiating a plurality of communications comprises initiating a communication with the second contact via one of the communication channels.

2. The method of claim 1, wherein the specified event is associated with one or more of the at least one contact, a communication persistence parameter, a geographic location, a date, and a communication channel.

3. The method of claim 1, further comprising displaying the plurality of contacts.

4. The method of claim 3, further comprising receiving selection of a subset of the plurality of contacts for communication, and wherein initiating a plurality of communications comprises initiating the plurality of communications with the selected subset of the plurality of contacts.

5. The method of claim 4, further comprising receiving selection of an order for communicating with the selected subset of the plurality of contacts, and wherein initiating a plurality of communications comprises initiating the plurality of communications with the selected subset of contacts in the selected order.

6. The method of claim 1, further comprising, in response to determining that one of the communications has been received, deleting a history of the other initiated communications.

7. The method of claim 1, wherein initiating a plurality of communications comprises initiating the plurality of communications via at least one of a telephone call, an email, a text message, and an instant message.

8. The method of claim 1, further comprising displaying a user interface guide, and wherein receiving the input comprises receiving the input into the user interface guide for specifying the event.

9. The method of claim 1, further comprising determining the plurality of communication channels.

10. The method of claim 9, wherein determining the plurality of communication channels comprises determining the plurality of communication channels based on the specified event.

11. The method of claim 10, wherein the specified event is associated with one or more of the at least one contact, a communication persistence parameter, a geographic location, a date, and a communication channel.

12. The method of claim 1, wherein the specified event is associated with a geographic location, and wherein determining the plurality of contacts comprises determining contacts within a predetermined distance of the geographic location.

13. The method of claim 1, wherein determining a plurality of contacts comprises dynamically determining the plurality of contacts based on the communication specification, and wherein initiating a plurality of communications comprises dynamically initiating the plurality of communications with the plurality of contacts via the plurality of communication channels.

14. The method of claim 1, further comprising reinitiating the plurality of communications until at least one of the communications is accepted.

15. The method of claim 1, further comprising, requesting that the second recipient device join in the accepted communication in response to determining that one of the communications has been accepted.

16. A system comprising:

at least a processor and memory;

a communication manager configured to:
   receive an input that specifies an event; and
   determine a plurality of contacts based on the specified event;
   determine whether an acceptance to any of a plurality of communications with the plurality of contacts has been received;
   control communication with the contact associated with the one of the communications that has been received; and
   control discontinuation of the other initiated communications;
   determine that one of the communications has been accepted by a first recipient device associated with a first contact; and a communication interface configured to:
   initiate the plurality of communications including initiating a communication with a second contact via one of the communication channels; and
   notify a second recipient device associated with a second contact of the accepted communication in response to determining that one of the communications has been accepted,
   wherein the specified event is associated with a first contact,
   wherein the communication manager is further configured to determine a geographic relationship between the first contact and the second contact.

17. A non-transitory computer-readable storage medium having stored thereon computer executable instructions for performing the following steps:

receiving an input that specifies an event;

determining a plurality of contacts based on the specified event;

initiating a plurality of communications with the plurality of contacts via a plurality of communication channels in response to the input, including initiating a communication with a second contact via one of the communication channels;

determining whether an acceptance to any of the plurality of communications has been received;

in response to determining that acceptance to any of the communications has been received:

communicating with the contact associated with the one of the communications that has been received; and discontinuing the other initiated communications;

determining that one of the communications has been accepted by a first recipient device associated with a first contact, wherein the specified event is associated with a first contact; and in response to determining that one of the communications has been accepted, notifying a second recipient device associated with the second contact of the accepted communication, determining a geographic relationship between the first contact and a second contact, wherein initiating a plurality of communications comprises initiating a communication with the second contact via one of the communication channels.

* * * * *